Sept. 17, 1940.  A. L. STIRN  2,214,939
FASTENING DEVICE
Filed June 3, 1938  2 Sheets-Sheet 1
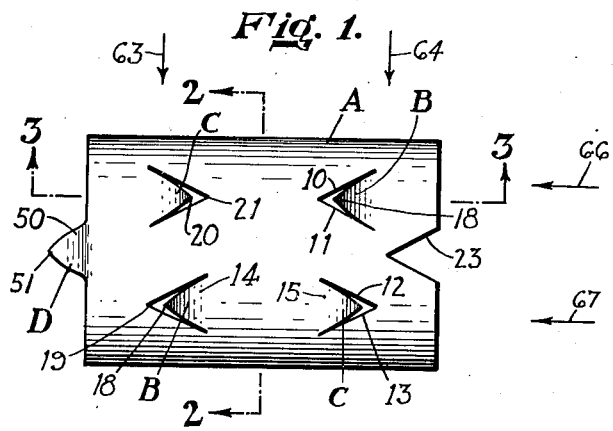
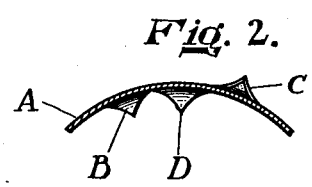
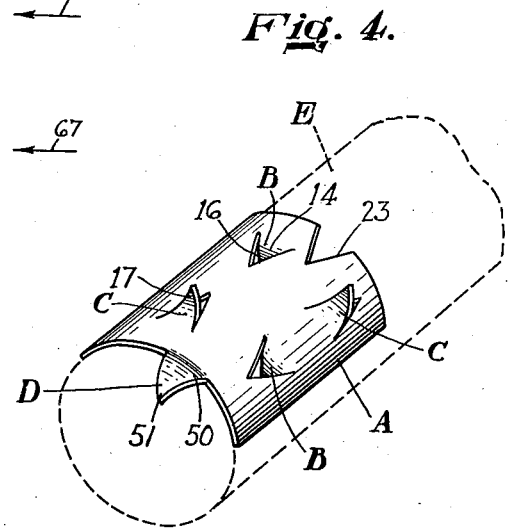
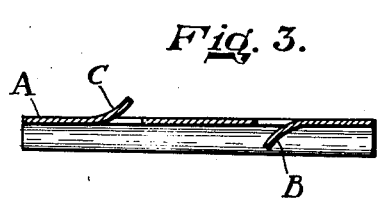
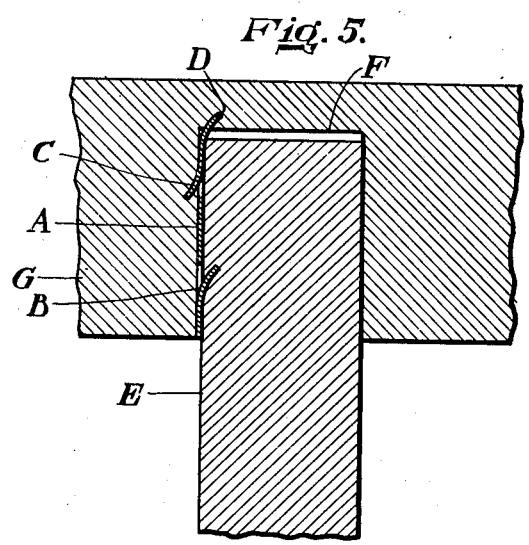
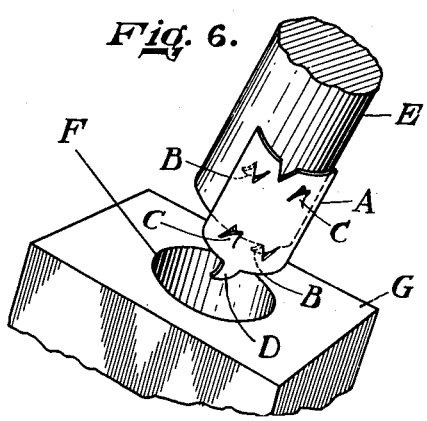
INVENTOR
ALBERT L. STIRN
BY
*Richards & Geier*
ATTORNEYS Sept. 17, 1940.   A. L. STIRN   2,214,939
FASTENING DEVICE
Filed June 3, 1938   2 Sheets-Sheet 2
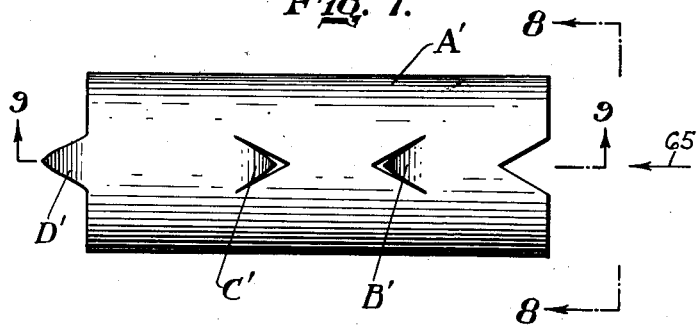
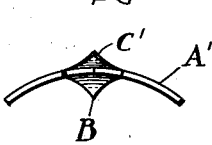
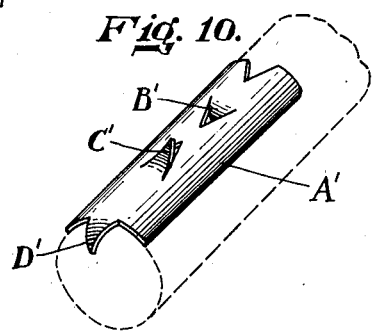
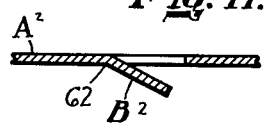
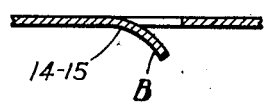
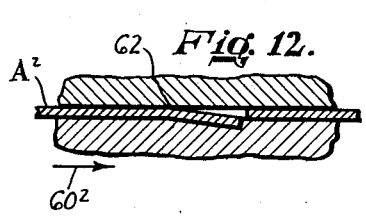
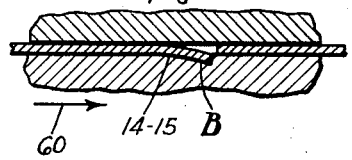
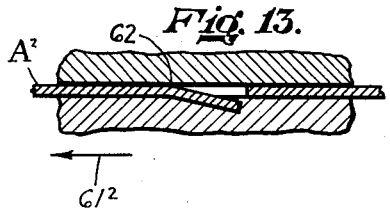
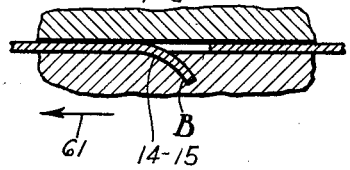
INVENTOR
ALBERT L. STIRN
BY
Richards & Geier
ATTORNEYS Patented Sept. 17, 1940

2,214,939

UNITED STATES PATENT OFFICE 2,214,939

FASTENING DEVICE

Albert L. Stirn, Staten Island, N. Y.

Application June 3, 1938, Serial No. 211,504

2 Claims. (Cl. 20—92)

The present invention relates to a fastening device and it particularly relates to a fastening device for use in connection with tenon and mortise joints of furniture, dowels, hammer heads, casters and the like involving a male element which is to be inserted in a socket in a female element.

Although the device of the present invention may be broadly utilized for various constructions in which elongated members are to be inserted in sockets of other members such as in furniture, tools, dowels, and so forth, it will be particularly described in connection with tenon and mortise joints with the understanding that this description will be by way of illustration and not by way of limitation.

It is, therefore, among the objects of the present invention to provide an improved fastening device of the character above described in which teeth may be formed in the curved plate fastening device, in such manner that they will securely and firmly maintain the tenon and mortise or other male and female joints or the connections of the ends of the rungs or legs to the chair frame or in sockets formed therein.

A further object is to provide an improved fastening device for use in tenon and mortise joints or other joints which will securely hold the ends of the rungs or legs in the chair frame, even though the wooden structure of the chair shrink and break loose from adhesive or glue employed in holding the chair frame together and even though the chair frame be subjected to substantial spreading or opening forces during usage.

A still further object is to provide an improved fastening plate of the character above described which may be properly located in respect to the end of the male element and which will assure proper engagement between the two elements when the joint is finally constructed.

Other objects will be obvious or will appear during the course of the following specification.

In the drawings is shown one embodiment by way of illustration and not by way of limitation since many changes and alterations may be made therein, all within the scope of the present invention.

In the drawings:

Figure 1 is a top elevation of the fastening device according to the present invention.

Figure 2 is a transverse sectional view upon the line 2—2 of Figure 1.

Figure 3 is a longitudinal sectional view upon the line 3—3 of Figure 1.

Figure 4 is a top perspective view showing the application of the device of Figures 1 and 3 to the end of the rung or leg.

Figure 5 illustrates the insertion of the leg with the device of Figures 1 to 3 into the socket or recess in the chair structure.

Figure 6 is a fragmentary perspective view illustrating how the fastening device may be applied in making the joint or connection.

Figures 7 to 10 illustrate an alternative narrower embodiment having a single row of teeth, as shown in Figures 1 to 6; Figure 7 being a top plan view of the device; Figure 8 being an end view upon the line 8—8 of Figure 7; Figure 9 being a transverse sectional view upon the line 9—9 of Figure 7 and Figure 10 being a top perspective view upon a somewhat reduced scale as compared to Figures 7 to 9, of a fastening plate positioned on a male element indicated in dotted lines.

Figures 11 to 16 diagrammatically illustrate the operation of the teeth of the present device as compared to the device having the sharply bent teeth; Figures 11 to 13 indicating a device with sharply bent teeth and Figures 14 to 16 indicating the device with the teeth bent in accordance with the invention of the present application.

In Figures 11 to 16, Figures 11 and 14 indicate the position of the teeth before formation of the joint; Figures 12 and 15 diagrammatically indicate the position of the teeth after the joint is formed and Figures 13 and 16 diagrammatically indicate the action of the teeth in resisting breaking of the joint after it has been made.

Referring to Figures 1 to 5, the plate A has a cylindrical contour and is provided with the forwardly extending teeth, tangs or prongs B, the rearwardly extending tangs, teeth or prongs C and the abutment tooth, prong, tang or extension D.

The plate A, together with the teeth B to D, cooperate with the end of the male element a rung E and with the socket F in the support or female member G in the manner indicated best in Figures 4 and 5.

The support member G may consist of the leg of a chair where the member E forms part of the rung of the chair or it may consist of the seat of the chair where the member E forms part of the leg of a chair.

The member E may also consist of a dowel caster, handle attached to a hammer head or other tool and so forth.

The plate A, as shown in Figure 1, is of cylindrical contour and the teeth B are cut out upon the triangular lines 10 and 11 for the teeth B and 12 and 13 for the teeth C.

The severance lines 10 and 11 and 12 and 13 extend side by side without separation for a substantial distance adjacent the bases 14 and 15 of the teeth B and C, respectively, and with the result that the base portions of said teeth B and C closely conform to the curvature of the plate A.

The outer portions of the teeth B and C, as indicated at 16 and 17 respectively, curve outwardly away from the base plate A.

The ends of the forwardly and inwardly directed teeth B are indicated at 18 and the ends of their recesses are indicated at 19 in Figure 1.

The ends 20 of the rearwardly and outwardly directed teeth C are indicated at 20 and the corresponding points of their recesses are indicated at 21.

By gradually curving the teeth in the manner indicated in Figures 1 to 4, there is no sharp bend line at the bases 14 and 15 of the teeth B and C.

The end tooth D is preferably centrally positioned and has the base portion 50 and the curved end portion 51. The recess 23 at the other end of the plate is formed so as to enable the removal of a tooth D in the next plate upon the stamping out or forming operations.

In operation, the element E is preferably placed against one of the inwardly directed teeth B at a point substantially removed from both ends of the plate A, as best shown in Figure 6.

Then, the element E with the plate A are inserted in the socket F in the member G and the male and female elements are hammered together or otherwise forced together.

When this occurs, the teeth B and C will be flattened, as indicated in Figures 5 and 15, and in some instances, the teeth B and C may be substantially forced back so that the points 18 and 19 and 20 and 21 will come together.

When the teeth are substantially flattened in the manner, as indicated in Figure 15, the element E will slide past the tooth B, which is shown as abutting in Figure 6, until it meets the tooth D as shown in Figure 5, which teeth D in the meanwhile, will be forced into the bottom of the socket F.

When this connection is formed with the resultant tooth construction, as indicated at B and C of the present application, the entire resiliency of the tooth will prevent dis-engagement, as for example, in the manner indicated diagrammatically in Figure 16.

In Figures 15 and 16, the arrow 60 indicates the inserting movement and the arrow 61 indicates the removing movement.

It will be noted that the curved tooth structure, as shown in Figures 14 and 16 will be much more effective than the sharply bent construction, as shown in Figures 11 to 13.

In the construction of Figures 11 to 13, when the tooth C² is forced from the position of Figure 11 to the position of Figure 12, the tooth element will not tend to spring back as readily to prevent retraction, as indicated in Figure 16.

The opposition to retraction will be solely at the sharp bend line 62 at the base of the tooth and will not be taken up by a spring or resilient action over the entire body of the tooth, as is indicated in Figure 16.

Moreover, when the teeth C² is bent back in position, as indicated in Figure 12, it will tend to retain its position and will not tend to be sprung outwardly in the manner best indicated in Figure 16 with the curved tooth construction.

In the construction, as shown in Figures 11 to 13, correspondingly functioning parts, as in Figures 1 to 6 and 14 to 16 are indicated by the same numerals with the superior "2".

It is, of course, obvious that the end of the element E may be inserted in abutment with a tooth in an outer row 64 instead of the inner row 63, as shown in Figure 1, or even against the teeth D at the outer edge of the plate A. Where more than two rows 63 and 64 are provided, the element E is preferably caused to abut at its end against the teeth in one of the intermediate rows substantially between the ends of the plate A in the manner indicated in Figure 6.

In Figures 7 to 10 is shown an alternative construction of the fastening plate in which the plate is only substantially half the width of the plate of Figures 1 to 6 and in which the end tooth D' is axially aligned with the forwardly and rearwardly extending teeth B' and C'.

This plate only has one row longitudinally of teeth 65 as compared with the two longitudinal rows 66 and 67 of Figure 1.

It is apparent, of course, that the plates A and A' may be provided with three or four or more lateral rows, the lateral rows being indicated at 63 and 64 in Figure 1 and they may also be provided with more than two longitudinal rows, the longitudinal rows being indicated at 65 in Figure 7 and 66 and 67 in Figure 1.

The fastener of the present application is of particular value in that it will hold the ends of the rung E in the socket F even though there be substantial contraction and expansion of the chair frame during usage.

The fastener device may be cut out inexpensively by automatic stamping machinery and the teeth will not be weakened by the manner in which they are formed.

Although the teeth B and C are shown as having the aligned axes, it is apparent they may have axes which are offset from one another and also that their axes may be inclined to the axis of the plate A.

Furthermore, the axis of the tooth D may be positioned at an inclination to the axis of the plate A and to the axis of the teeth B and C, or the tooth D may have its axis aligned with one of the axis of the teeth B and C.

Although the metal plate is shown as being substantially rectangular in contour, other shaped plates may be employed.

A particular advantage of the present application resides in the fact that the gripping action of one or more of the teeth will not affect the gripping action of the other teeth.

Although the fastening device of the present application is particularly designed for use with tenon and mortise joints, it is also designed to be utilized with many other types of joints.

Where an adhesive, such as glue, is also utilized the adhesive bond will not become readily broken and the joint will not readily separate even after long periods of time.

It will be particularly noted that the tangs or teeth B and C are arranged so that they will be balanced on opposite sides of the plate A.

It is obvious, of course, that the curved end tang D, as shown in Figure 1, might be utilized with teeth B and C bent in other fashion than illustrated. For example, the teeth may be bent, as illustrated in Figure 11.

On the other hand, either the teeth B or C might be bent in the manner shown in Figure 11 while the other teeth might be bent in the manner indicated in Figure 14.

Generally, however, it is desirable that all the teeth be bent in the manner best indicated in Figure 14 with the bases of the teeth being substantially tangent to the metal plate A.

It is obvious, of course, that the plate A instead of being curved might be flat or might be bent at an angle to fit on the corners of triangular, square or polygonal male members.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. A toothed curved fastening plate to be inserted between a male member and the side of a socket in the female member, comprising a thin metal plate capable of insertion between one side of the male member and the side of the socket in the female member and of a width less than the width of the male member and having tangs, stamped from said plate and projecting from opposite surfaces of the plate and extending toward opposite ends thereof, the inner ends and bases of the tangs conforming tangentially to the curvature of the plate and said tangs curving away from said plate without a sharp bend, and being also provided with a tang projecting from the entering end thereof for penetrating the bottom of the socket, said last mentioned tang being curved gradually inwardly and engageable with the end of the male member to function as a stop in the assembly of the male member and plate incidental to insertion of the male member into the socket.

2. A thin curved fastening plate to be inserted between male and female members to fasten them together, said plate having pointed triangular shaped teeth stamped directly out of the body thereof intermediate of the length and width of said plate, all of said teeth extending longitudinally of the axis of the plate and some of said teeth extending outwardly from the convex side of the plate and others extending inwardly from the concave side of the plate, the base of each of said teeth being integral with and tangential to the body and curve of said plate and said teeth curving gradually outwardly from the body of the plate to the points of the teeth which are substantially spaced away from the body of the plate, the base of each tooth being devoid of sharp bend lines.

ALBERT L. STIRN.